United States Patent [19]
Raymond

[11] 3,986,396
[45] Oct. 19, 1976

[54] WIND INDICATING DEVICE

[76] Inventor: George E. Raymond, P.O. Box 11211, Fresno, Calif. 93772

[22] Filed: Jan. 21, 1974

[21] Appl. No.: 435,284

Related U.S. Application Data

[63] Continuation-in-part of Ser. No. 141,653, May 10, 1971, abandoned.

[52] U.S. Cl. .............................................. 73/189
[51] Int. Cl.² ....................................... G01W 1/04
[58] Field of Search ............................. 73/189, 188

[56] References Cited
UNITED STATES PATENTS

| | | | |
|---|---|---|---|
| 1,548,353 | 8/1925 | Day | 33/355 |
| 1,982,304 | 11/1934 | Holden | 33/137 R |
| 2,608,859 | 9/1952 | Sontag et al. | 73/189 |
| 2,623,388 | 12/1952 | Wood et al. | 73/189 |
| 2,749,750 | 6/1956 | Hastings | 73/189 |
| 2,935,872 | 5/1960 | Misner | 73/189 |

FOREIGN PATENTS OR APPLICATIONS

| | | | |
|---|---|---|---|
| 1,472,487 | 3/1967 | France | 73/188 |
| 4,693 | 1/1911 | United Kingdom | 73/189 |

Primary Examiner—James J. Gill
Assistant Examiner—Anthony V. Ciarlante

[57] ABSTRACT

In a first preferred embodiment my wind indicator is formed of a fan rotor attached to a verticalshaft rotatably mounted in a C-shaped frame. Also mounted on the shaft is a pair of pendulums which are pivoted to swing outwardly by centrifugal force as the shaft is rotated. When wind strikes the fan rotor it rotates and the faster the shaft rotates, the further outward the pendulums move. A scale is provided on the C-shaped frame adjacent the path of outward movement of the pendulums from which the wind velocity can be visually determined. In a second embodiment the fan rotor, shaft and pendulums are mounted in a frame of three vertically disposed C-shaped members disposed at 120° spacing. The frame is in turn rotatably mounted in a base. A horizontally disposed direction indicator is mounted on the frame, and carries an octagonal direction dial with numerals on each side. The wind velocity scale and direction dial numbers are of sufficient size to be read from a substantial distance. In a third embodiment the wind indicator frame is formed of a pair of quarter circle members assembled in divergent relationship to describe a weather vane, and the shaft is fixed in a base and the frame rotates on the shaft. The fan rotor also rotates on the shaft and carries the pendulums.

16 Claims, 14 Drawing Figures

GEORGE E. RAYMOND
INVENTOR

Virgil L. Gerard
ATTORNEY

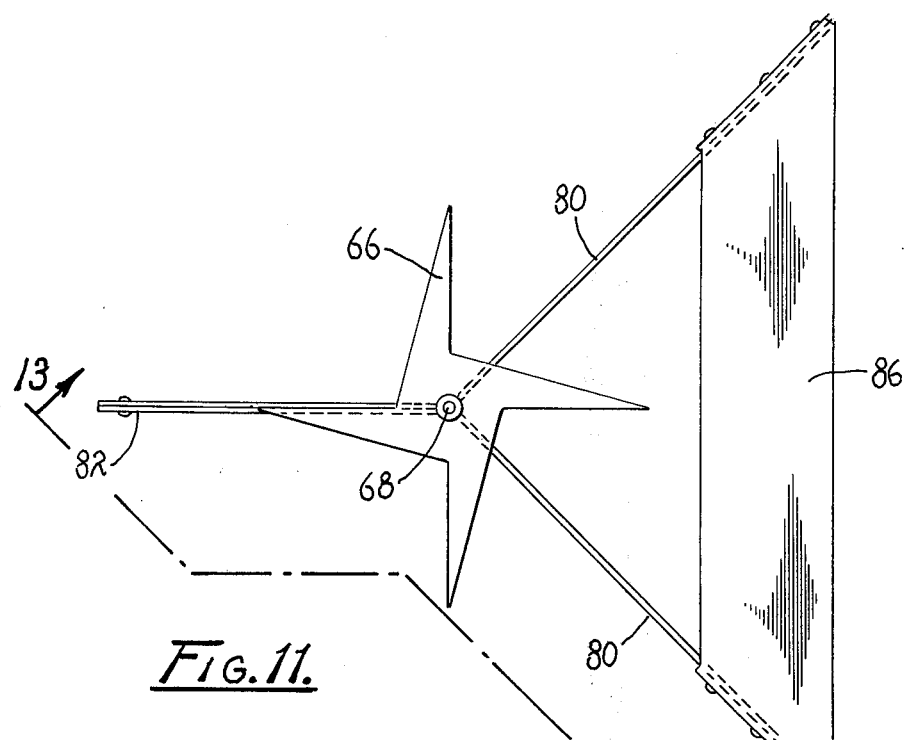
_Fig.11._
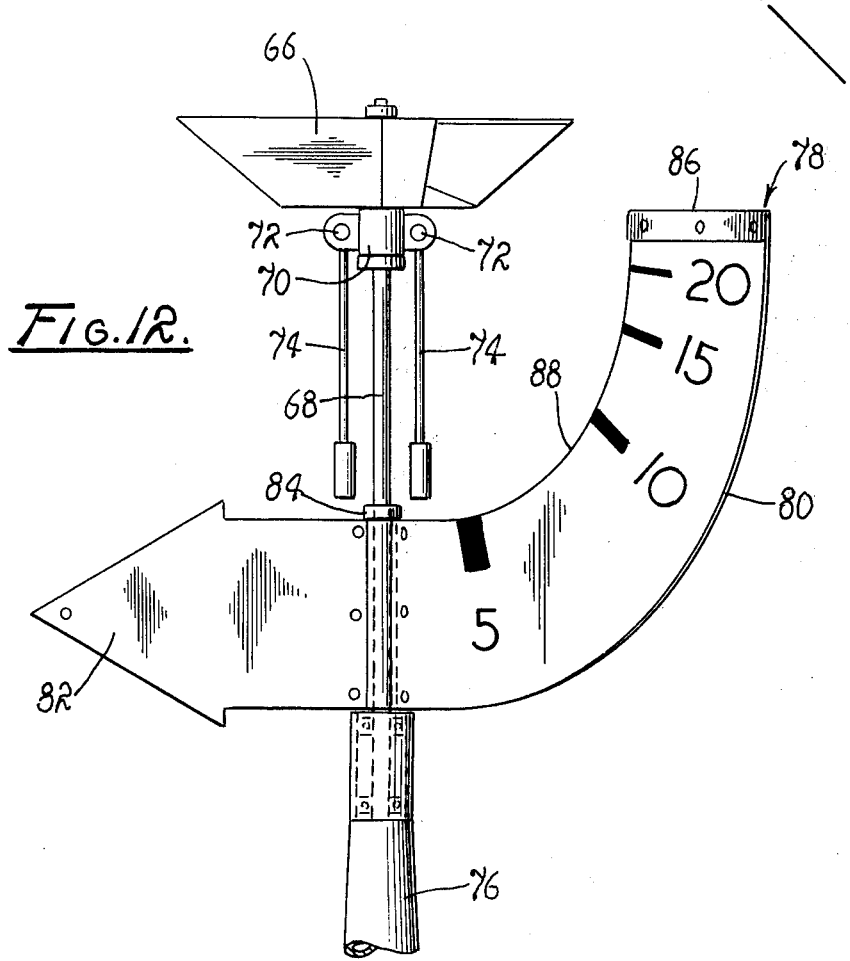
_Fig.12._

WIND INDICATING DEVICE

BACKGROUND OF THE INVENTION

This invention relates generally to wind indicators and more particularly to combined anemometers and wind vanes which are self propelling and visibly readable from substantial distances.

Many forms of wind speed indicators are now in use, and are capable of transmitting information to remote indicators, which when monitored by man or machine will give up this information to the monitor, which in all cases must be in close proximity to the indicator. Relieving this need for close proximity to the indicator is one of the improvements my machine affords. My wind indicator permits this range of proximity to be greatly extended, which is particularly useful when the information disclosed is desired to be made instantly and continuously available to a dispersed and mobile group of people, from whatever their vantage point with a 360° azimuth of the device. The use of optical aids will extend even further the useful range of the device.

A characteristic of most know anemometers is the use of a sensing device, which by design rotates with a peripheral speed nearly equal to the wind speed at the point of tangency, and a recording system is designed to offer a nearly constant and insignificant load factor to the sensing device, and measure its speed of rotation differentially. In my device a dynamic rotor is mounted on a shaft, and free to rotate. When the rotor is in a medium in motion, then the energy transmitted to the shaft through the rotor may be measured in terms of work done on the shaft, with the speed of rotation disregarded, except as an incidental occurance. The work done on the shaft may be accurately measured and continuously displayed by the angular displacement of conical pendulum arms, free to rotate in angular displacement from the axis of the shaft. This scheme differs from the others in that as the energy of the medium to be measured increases, a significant increasing work load is placed upon the shaft through the pendulum arms causing the rotor to rotate at a slower speed proportionate to the work being done, rather than in direct proportion to the velocity of the medium.

The most common anemometers consist of cups or cones mounted on the spokes of a rotatable wheel. These anemometers indicate wind speed by reading the rotations per minute of the wheel. Such instruments are made for graphic or meter dial readout and are not suitable for providing wind speed information to persons not in close proximity to the readout device. Wind vanes of the pivoted arrow type are well known and provide wind direction information to persons at a fair distance but not at a substantial distance where the directional position of the arrow cannot be accurately ascertained. In many outdoor activities which are popular today wind information is helpful to the participants, and yet the participants are too mobile to make use of such information if it is available only at a central point and must be read from close proximity. Golf courses, rifle ranges, airports, farms and industrial plants are all examples of facilities where wind information available to mobile people from substantial distances would be quite useful. Efforts have been made in the past to combine a wind vane and anemometer into a self propelled wind information device but none of these devices has been commercially successful for they have not truly met the need. The prior devices have either failed to provide a facility for readily indicating wind velocity in a manner capable of enlarged display, or have failed to display the wind information in a manner which permits its reading from all directions and substantial distances.

It is, therefore, a major object of my invention to provide an improved wind indicator which displays wind velocity and direction in such a manner that it is readily readable from any direction within its visual range, whereby wind information can be provided to a dispersed and mobile group of people.

It is also an object of my invention to provide a wind indicator of the type described which indicates both the wind velocity and wind direction.

It is another object of my invention to provide a wind indicator of the type described in which a fan rotor is utilized to sense the wind and the wind velocity is indicated by the movement of a pair of pendulums away from the vertical axis of the fan rotor by the effect of centrifugal force.

It is a further object of my invention to provide a wind indicator of the type described in which the wind velocity is readable by means of a non-linear scale set out along a surface adjacent the path described by the distal ends of the pendulums attached to the fan rotor shaft.

It is still another object of my invention to provide a wind indicator of the type described in which the wind direction is sensed by a wind vane attached to the frame housing the anemometer and the direction is provided by an indicator which can be seen from substantial distances.

It is still a further object of my invention to provide a wind indicator of the type described which is relatively simple to construct and practically maintenance free in operation.

It is still a further object of my invention to provide a wind indicator of the type described which can be used as a decorative device as well as a wind velocity and direction indicator and which has substantial interest appeal to the observer.

These and other objects and advantages of my invention will be more readily apparent from the following detailed description of preferred embodiments thereof, when read together with the accompanying drawings in which:

FIG. 11 is a plan view of a third embodiment of my invention in which the frame serves as a direction indicator;

FIG. 12 is an elevational view of the embodiment shown in FIG. 11 with the fan rotor at a standstill;

Figure 1:
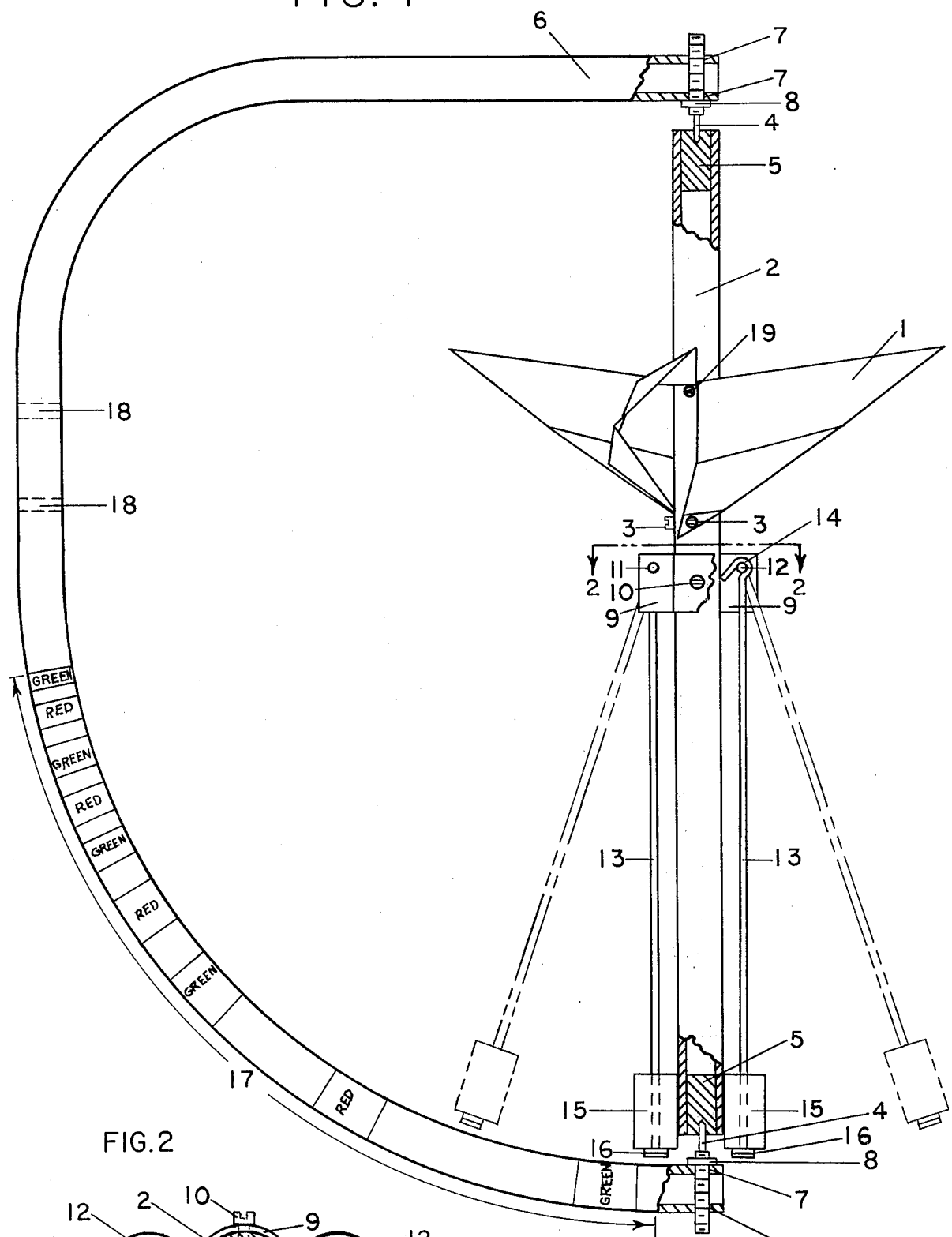
FIG. 1 is a side elevational view of the first preferred embodiment of my invention.
Figure 2:
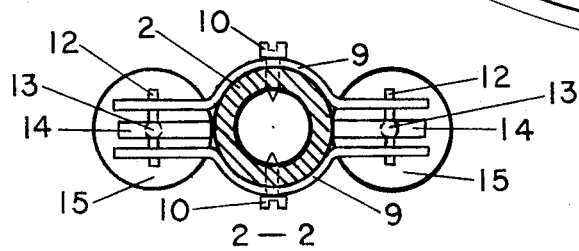
FIG. 2 is a partial sectional view taken on line 2—2 in FIG. 1.

Referring now to the drawings and particularly to FIG. 1 thereof, I show a first preferred embodiment of my invention.

The wind indicator in this embodiment consists of a rotor 1, to be more completely described later, which is affixed to a shaft 2, by self tapping screws 3. The shaft 2 is pivoted by means of needle bearings 4, and journals 5. Needle bearings 4 are affixed to a frame 6 through tapped holes 7 and are secured adjustable by locking nuts 8. Also affixed to shaft 2 is clevis 9 by means of self tapping screws 10. In clevis 9 are holes 11, receiving pivot pins 12, secured by press fit. Pendulum arms 13, preferably a pair to achieve balance, are engaged on pivot pins 12 by means of hook or eye 14 formed on the apex end of pendulum arms 13. Flyweights 15 are impaled on the active ends of pendulum arms 13 and secured by locking nuts 16. A calibrated scale 17 is painted or otherwise marked on or adjacent to frame 6. Calibrated scale 17 is preferably marked by tri colored bands, although mono colored marking and numerals may also be used. The preferable system of band marking is for each 10 mile per hour multiple of wind speed to be indicated by a distinctive color, such as red, and for the intervening 5 mile per hour multiples to be indicated by a distinctive contrasting color, such as green, with any intervening spaces colored white. Mounting holes 18 are provided in frame 6 for bolting or othrwise securing the device to any convenient and adequate standard to dispose the device to the wind.

Figure 4:
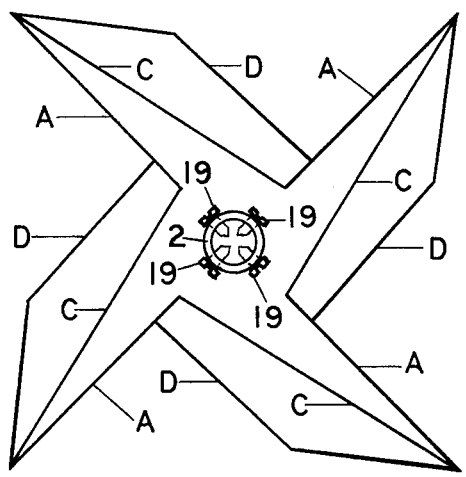
FIG. 4 is a top plan view of my fan rotor in a completed form.
Figure 5:
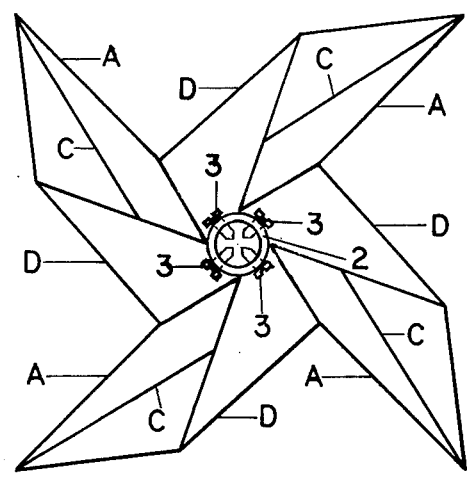
FIG. 5 is a bottom plan view of my fan rotor in completed form.
Figure 3:
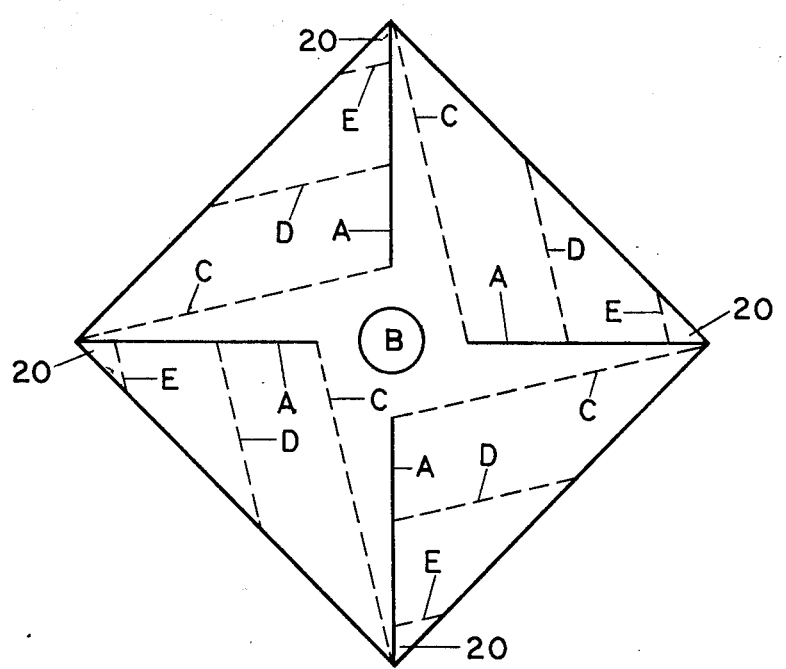
FIG. 3 is a plan view of the blank from which the fan rotor of my invention is formed.
Figure 6:
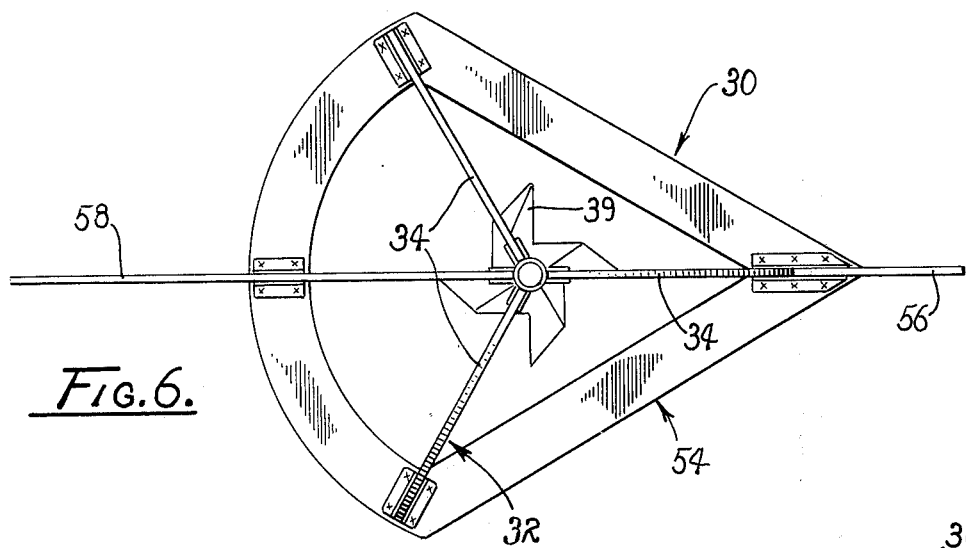
FIG. 6 is a plan view of a second embodiment of my invention which includes a wind direction indicator as well as a wind velocity indicator.
Figure 8:
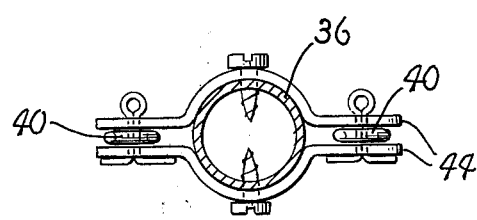
FIG. 8 is a cross sectional view taken on line 8—8 in FIG. 7.
Figure 7:
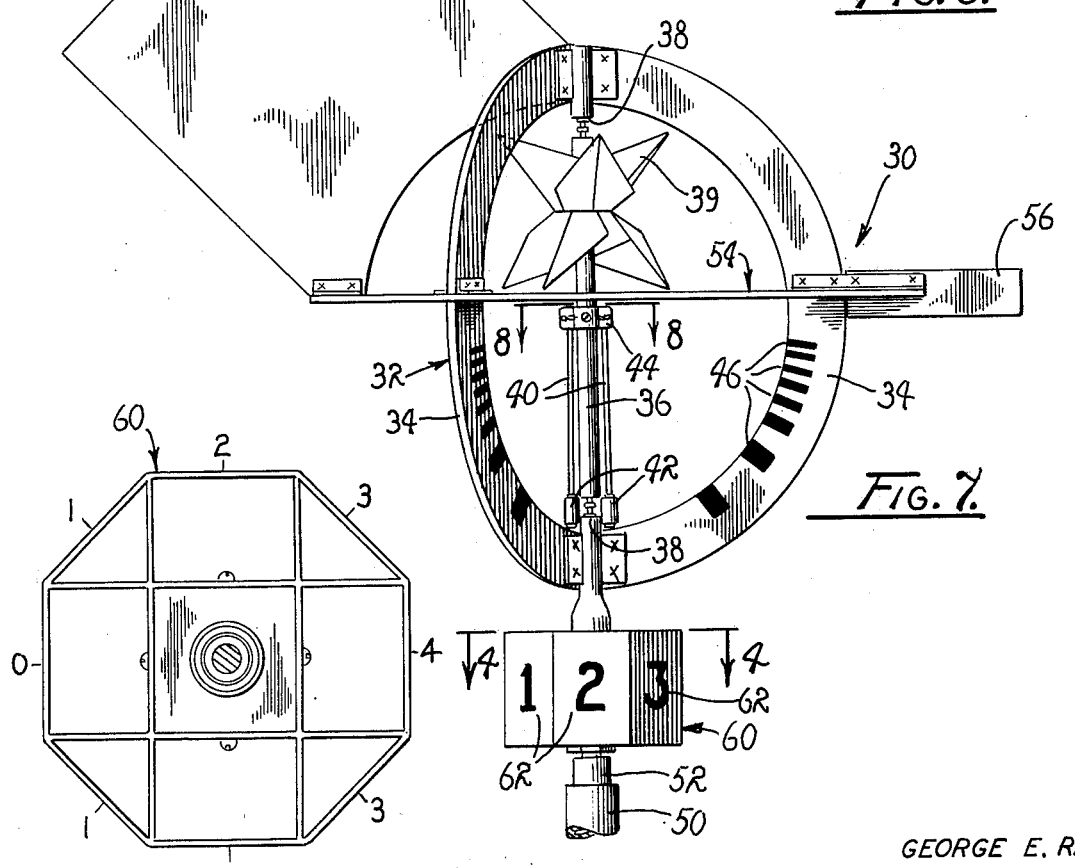
FIG. 7 is a side elevational view of the second embodiment of my invention as shown in FIG. 6.
Figure 9:
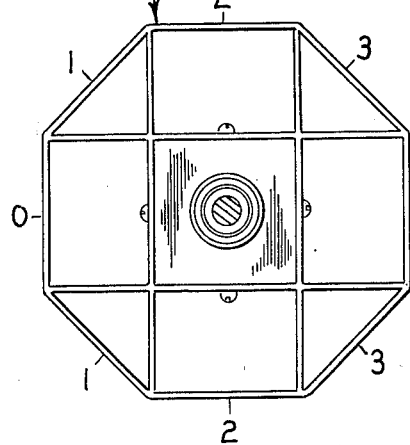
Figure 10:
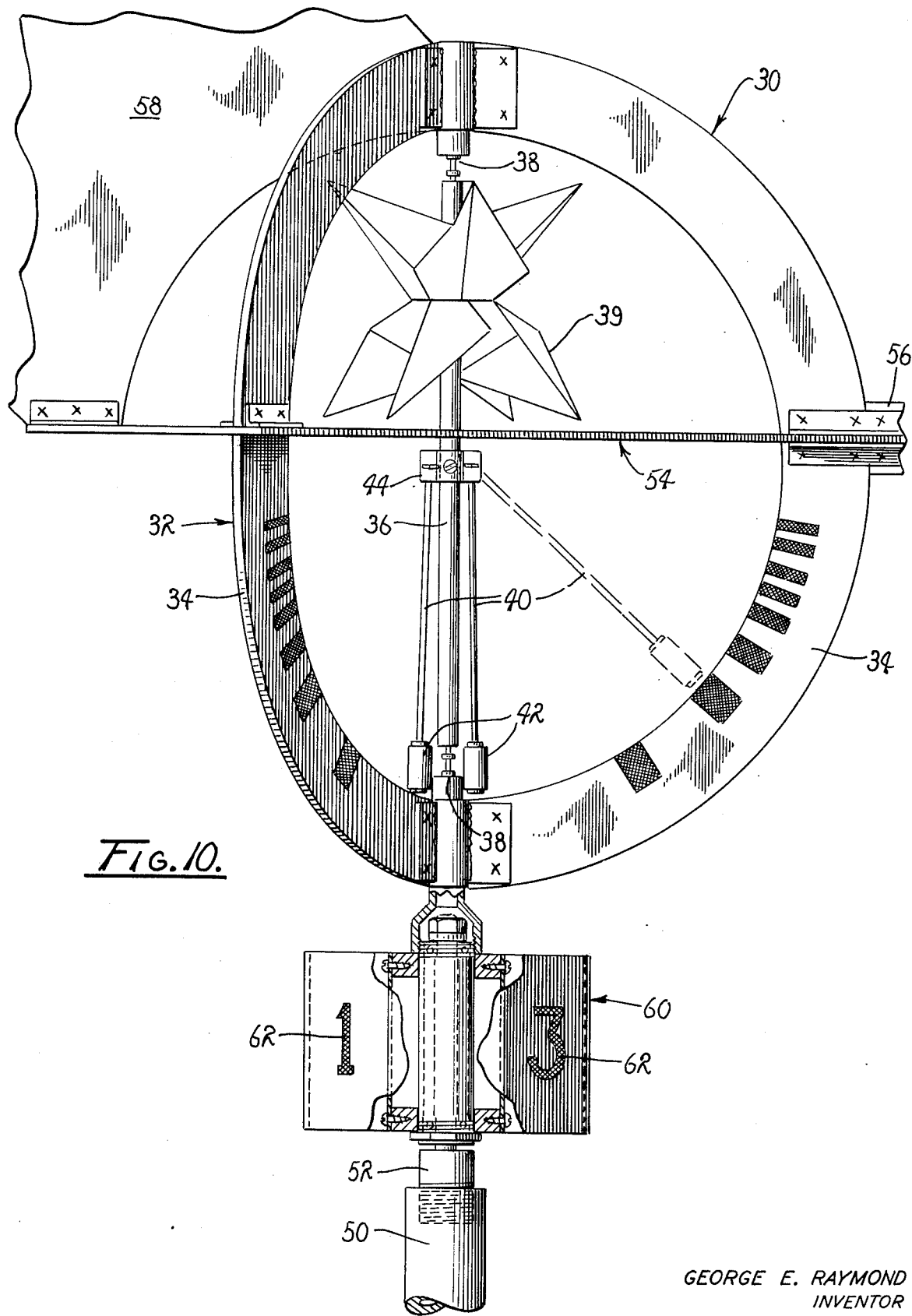
FIG. 10 is an enlarged partially sectioned side elevational view of the second preferred embodiment of my invention showing the manner of reading wind velocity and direction.
Figure 13:
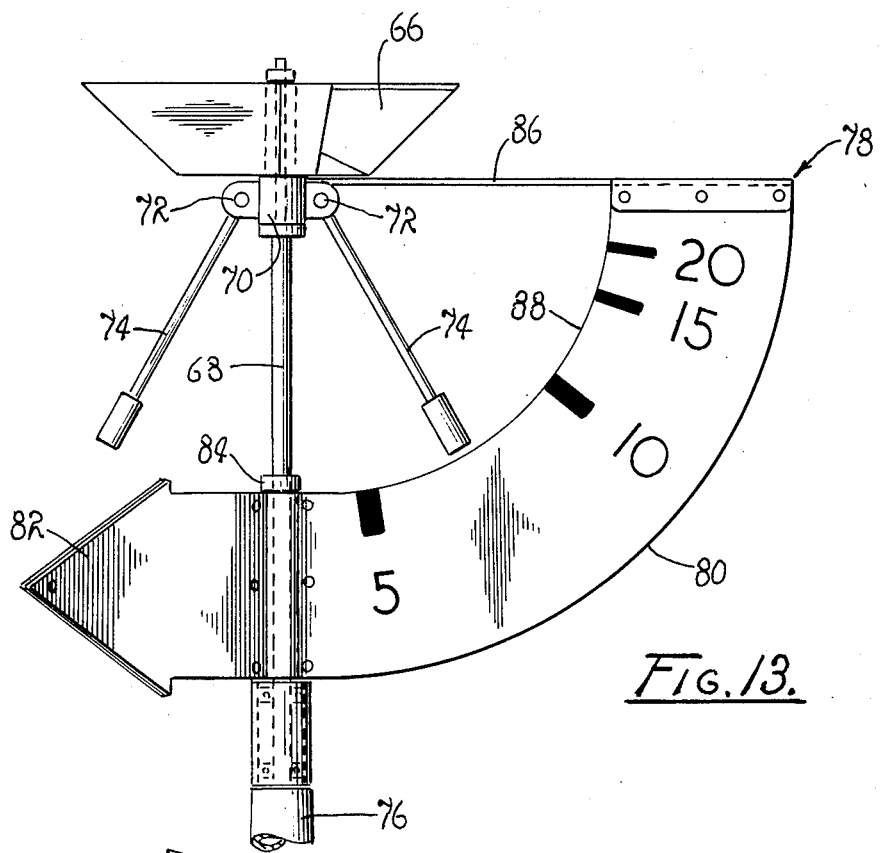
FIG. 13 is an elevational view of the embodiment shown in FIG. 11 with the fan rotor in motion taken at 13—13.
Figure 14:
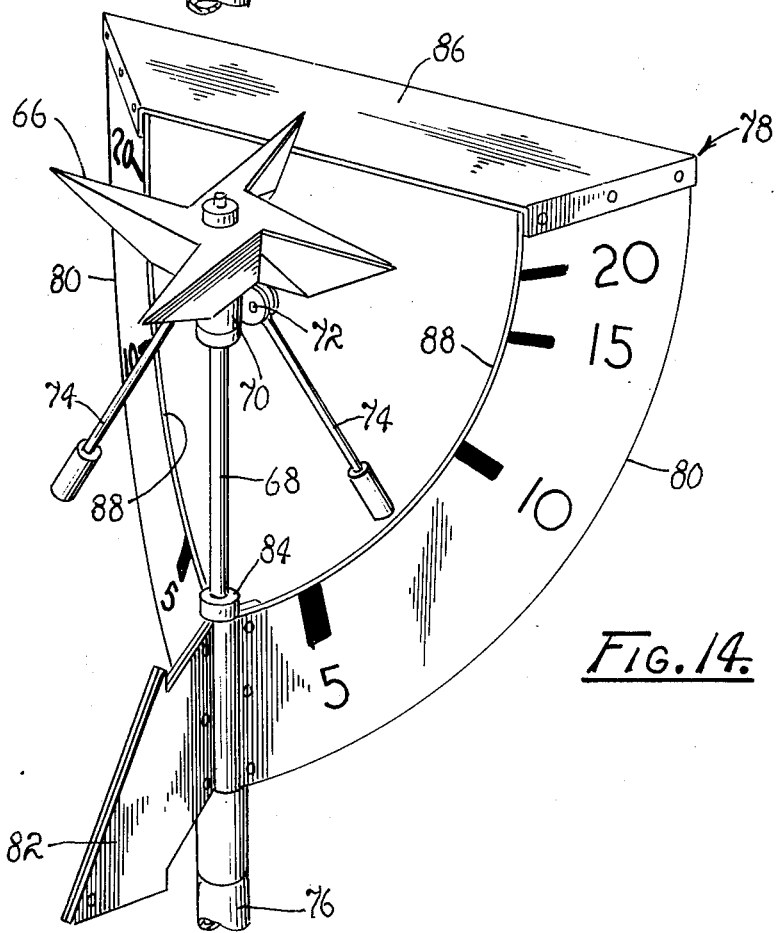
FIG. 14 is a perspective view of the embodiment shown in FIG. 11 with the fan rotor in motion.

Construction of rotor 1 is now more fully described with reference to FIGS. 3, 4 and 5. FIG. 3 depicts a square blank of flat material from which the rotor is cut and formed. Diagonals A are defined, and their projected continuation at the point of intersection marks the center of circle B which is cut out to fit over shaft 2. Solid lines A are cut lines, and are sheared as shown. Holes 20 are punched to receive self tapping screws 3. Dashed lines C, D and E are fold lines. Lines C and D are folded downwardly and line E is folded oppositely, to the dispositions shown in FIGS. 1, 4 and 5. Self tapping screws 19 are inserted in holes in shaft 2 to maintain pitch stability. Self tapping screws 3 are inserted through holes 20 to secure the rotor to the shaft.

With the device disposed with shaft 2 in a vertical position and exposed to an existing wind, movements of the air impinges on rotor 1, causing the coupled shaft 2, pendulum arms 13 and flyweights 15 to rotate in unison. As the assembly rotates in acceleration, centrifugal and centripedal forces are generated in the assembly, causing the pendulum arms 13 and flyweights 15 to pivot about pivot pins 12 in an increasing radius from the axis of shaft 2. As the radius increases the flyweights 15 are lifted higher, and also their peripheral speed caused to increase. This requires that work be done and is opposed by friction, inertia, and aerodynamic considerations. This work will lift the pendulum arms and the flyweights against the force of gravity, until the point of equilibrium is reached where the pendulum arms and flyweights stand in angular disposition to the axis of the shaft commensurate with the energy extracted from the air by the rotor. There is only one point of equilibrium for each velocity of air, given a standard temperature and density, and this angular disposition is read on the calibrated scale 17 in miles per hour as the pendulum arms and flyweights pass in proximity to the scale at each revolution. In deceleration the process works in substantially reverse order, with momentum supplanting inertia as a factor.

The degree of sensitivity is controlled by the ratio of rotor power or efficiency to the work required to accelerate the flyweights and pendulum arm. For this reason, the variations possible to the device are extremely numerous, making it adaptable to a wide variety of applications.

In my second embodiment shown in FIGS. 6 through 10, the numeral 30 represents my wind indicating device generally. The wind indicating device 30 has a support frame 32 consisting of three vertically disposed C-shaped frame members 34 connected at their apexes and positioned around an axis through their apexes at 120° spacing. A shaft 36 is vertically disposed and bearing mounted between the upper and lower apexes of the support frame 32 by bearings 38 generally similar to the bearings described by my first embodiment. A fan rotor 39 is mounted on the shaft intermediate its ends in substantially the same manner as in my first embodiment, and a pair of pendulum arms 40 with fly weights 42 on their distal ends are mounted on the shaft by means of brackets 44 in substantially the same manner as in my first embodiment. My second embodiment has indicia 46 constituting a scale similar to the scale in the first embodiment on each of the three members 34 which form the support frame 32. Since the frame members 34 are disposed at 120° segments, this permits the scale indicia 46 to be viewed from any azimuth position of the wind indicator.

The support frame 32 is rotatably mounted on a base 50 by means of a base bearing 52. A pointer frame 54 is disposed generally horizontally about the periphery of the three frame members 34 of support frame 32 with a pointer member 56 attached to its forward end and extending outwardly therefrom. At the rearward end of the pointer frame 54 a wind vane 58 is mounted on the support frame 32 by attachment of its lower end to the pointer frame and its upper end to upper apexes of the support members 34 and extends rearwardly therefrom. On the support frame 32 below the lower apexes of the support members 34 and aligned with the shaft 36 is an octagonal segment indicator 60. The segment indicator 60 is affixed to the support frame 32 and rotates with the support frame on the base 50. The segment indicator 60 has direction indicia 62 on each of its eight faces to indicate its rotational position with respect to the base. The faces of the segment indicator positioned in the direction opposite that of the pointer 56 bears the numeral 0, the two faces on each side of the 0 face bear the numeral 1, the two faces adjacent and forward of the 1 faces bear the numeral 2, the two faces next forward bear the numeral 3, and the face directed the same as the pointer 56 bears the numeral 4. The segment indicator 60 and its face numerals are sufficiently large to be seen from a considerable distance, and at least from as far away as the scale indicia can be read. Therefore, an observer seeing the numeral 4 on the segment indicator will be informed that the wind is blowing from directly behind him, or seeing the numeral 0, that it is blowing from directly in front of him. If the observer sees the numeral 2 he will know the wind is blowing at right angles to him and by observing the position of the wind vane 58 he will know whether the wind is from his left or from his right. That is, if the wind vane 58 is on his left the wind is blowing from his right. Finally, by similar observations, upon seeing the numerals 1 or 3 and the position of the vane 58, an observer can immediately determine the wind direction from some other octant, and the number of octants or "points" from his facing position he must turn (away from the wind vane side) to face the wind.

Since the scale indicia in my second embodiment are the same as in my first embodiment, except that the indicia are located on all three support members 34 and therefore observable from any azimuth position, the observor can determine the wind velocity as readily as its direction. If, for example, the distal ends of the pendulums are swung out to the second red band, the observor will know the wind speed is 20 miles per hour, or if they have swung out to the second green band he will read the wind speed as 15 miles per hour.

The operation of my second embodiment, is, of course, substantially the same as that of my first embodiment except for the movement of the support frame 32 on the base 50 with changes in wind direction. That is, the fan rotor 39 will revolve when subjected to a wind current rotating the shaft 36 and swinging the distal ends of the pendulum arms 40 and flyweights 42 outwardly from the shaft axis. The relative position of the distal ends of the pendulum arms 40 on the scale indicia 46 will indicate the wind speed as explained above.

At the same time, the support frame 32 will itself be rotated on the base 50 by means of base bearing 52 because of the wind current striking the wind vane 58. The wind vane 58 will rotate the support frame 32 to a position where the pointer member 56 is directed into the wind and will carry with it the segment indicator 60, thereby displaying wind direction information to the observer as explained above.

In a third embodiment of my invention, shown in FIGS. 11 to 14, the fan rotor 66 is rotatably mounted on the upper end of the shaft 68 and has a hub 70 with ears 72 to which the pendulums 74 are pivotally attached. The base of the shaft 68 is fixed in a stanchion 76 for support and a frame 78 is rotatably mounted on the lower end of the shaft just above the stanchion.

The frame 78 is formed of two quarter-circular members 80 which connect together at their lower ends and form an arrowhead 82. A frame mounting hub 84 is provided just rearward of the arrowhead 82 by which the frame is rotatably mounted on the shaft 68. The members 80 diverge from the mounting hub 84 to their upper ends where they support a cross-member 86.

The inner edges of the members 80 parallel in close proximity the arcuate path described by the rising of the pendulums and each carry a scale 88 calibrated to indicate wind speed.

Like my second embodiment, in operation my third embodiment indicates both wind speed and direction. Wind speed is indicated when the fan rotor is rotated by the wind and thereby causes the pendulums 74 to swing outward.

Since the scales 88 are calibrated to read wind speed by reference to the position of the distal ends of the pendulums 74 along their arcuate paths as previously explained, an observer can read wind speed by noting the outswing position of the pendulum along the scale as the fan rotor revolves. To assure ready readability, the scales 88 are located on the inside of the members 80, as well as on the outside.

Direction is determined by the observer by noting the position of the weather vane frame 78 which can be done from a distance because of its unique configuration. For example, if the wind is blowing directly toward the observer he will see both of the upper ends of the quarter-circular members 80 equally, and will not see the arrowhead 82. If the wind is blowing away from the observer the frame 78 will look substantially the same since the scales 88 are placed on the insides as well as on the outsides of the members 80. If the wind is at right angles to the observer the frame 78 will appear as in FIG. 12, or as a mirror image thereof. If the wind is at an oblique angle to the observer the frame 78 will indicate this by an appearance similar to that shown in FIG. 14.

Therefore, by reason of the unique shape of frame 78 a distinctive appearance discernible by an observer is provided for each wind direction which permits him to ascertain the direction, and the position of the pendulums on the scales 88 permit him to determine its speed.

It will thus be understood from this detailed description of preferred embodiments of my invention that I have provided an extremely useful wind indicating device primarily novel in its ability to communicate wind speed and direction information to distant observers. While it may be possible to translate this information from presently known close view indicators into some sort of display readable by distant observers, any such display would be either quite complex or expensive, or would require constant manning by an attendant. On the other hand, my invention provides this information to observers both distant and close as an original readout, and completely without further attention or display. As a result, golfers on a golf range, marksmen on a shooting range, pilots flying over an airfield, drivers on a highway, and many other participants in mobile activities can readily obtain wind information helpful to them and related directly to their particular momentary position.

It should also be understood that the range of wind speeds covered by the scale indicia depend on the design criteria of the fan rotor, pendulum arms, and fly weights, and frame. By experimentation I have proven my device in a size visible at over 100 yards to work effectively from 3 to 40 miles per hour, which covers the range of greatest interest. By suitable alterations I have also been successful in providing my device with a 1 to 25 miles per hour range and a 5 to 45 miles per hour range.

From this detailed description it should, therefore, be understood that my invention is fully capable of obtaining the objects and providing the advantages hereto attributed to it.

I claim:

1. An improved wind indicating device comprising:
   a base having a vertically disposed shaft therein;
   rotor means interconnected with said shaft and rotatable with respect to said base, said rotor means being disposed for engagement and rotation by wind currents in the vicinity of said base;
   pendulum means drivingly interconnected with said rotor means and disposed to rotate about the axis of said shaft upon rotation of said rotor, said pendulum means including an arm pivotally mounted at its proximal end adjacent said shaft and having its distal end disposed to swing outwardly with respect to said shaft axis upon rotation of said rotor means to describe an arcuate path on a vertical plane containing said shaft axis; and vane means including a frame movably supported by said base for rotation about the axis of said shaft independent of the rotation of said rotor, said frame having fin means and disposed for engagement by wind currents in the vicinity of said base for movement of said frame into alignment therewith, and an arcuate marginal edge with scale means and thereon disposed in a vertical plane containing said shaft axis and adjacent a portion of said arcuate path described by said pendulum means distal end, said scale means being movable with said frame and having indicia constituting a readable scale whereby the position of said pendulum distal arm end on said arcuate path with reference to said indicia indicates the wind velocity and wind direction indicator means operatively associated with said frame and disposed to indicate wind direction to a distant observer 2. An improved wind indicating device as described in claim 1, in which:

said vane means frame includes a C-shaped support member disposed in a generally vertical position;

said shaft is bearing mounted in the distal ends of said C-member and disposed generally vertical therebetween;

said rotor means are attached to said shaft;

said pendulum means are attached to said shaft; and said indicia constituting a readable scale are disposed along the marginal edge of said C-shape support member adjacent said path of the distal end of said pendulum means arm whereby the position of the distal end of said arm with reference to said indicia indicates the wind velocity.

3. An improved wind indicating device as described in claim 2, in which:

said rotor means constitutes a fan having aerodynamically disposed fan blades;

said shaft is rotatably mounted in said C-shaped support member by means of needle bearings disposed to permit rotation of said shaft in said member with extremely low friction; and said scale indicia are readable by the naked eye from a distance of at least one hundred feet from said frame.

4. An improved wind indicating device as described in claim 1, in which:

said vane means frame includes a semi-circular support member disposed to provide a vertical axis between its upper distal end and its lower distal end;

said rotor means includes a fan having aerodynamically disposed fan blades; and said scale indicia includes markings on the lower quadrant of said support member, spaced to correspond to predetermined positions of the distal end of said pendulum arm at particular wind velocities, said markings being color coded to represent velocity multiples and sufficiently large to be visible to the naked eye of an observer one hundred yards distant from said device.

5. An improved wind indicating device as described in claim 1, in which:

said vane means frame includes a pair of arcuate members disposed in generally vertical intersecting planes with their lower ends joined at said intersection to form a mounting hub with their distal portions extending beyond said hub to form a direction indicator and their upper ends diverging upwardly from said hub and interconnected at their distal portions by a generally horizontal wing member whereby said upper ends of said arcuate members and said wing member form a tail for said direction indicator which responds to movements by moving said frame to direct said direction indicator into the wind.

6. A wind indicating device as described in claim 1, in which:

said wind velocity scale indicia is of sufficient size to be read with the naked eye by an observer one hundred feet distant from said device; and said wind direction indicator means includes indicia of sufficient size to be read with the naked eye by an observer one hunder feet distant from said device.

7. A wind direction indicator as described in claim 1, in which:

said wind velocity scale indicia includes markings disposed on a quadrant formed integral with said frame and disposed adjacent the path of outward swing of the distal end of said pendulum arm, said markings being spaced to correspond to predetermined positions of the distal end of said pendulum arm at particular wind velocities, and color coded to represent velocity multiples, and said markings being sufficiently large to be visible to the naked eye of an observer one hundred yards distant from said device; and said wind direction indicator means includes an octagonal member interconnected with said frame with indicia in each octant representing a particular azimuth point, whereby a distant observer may determine wind direction relative to his facing.

8. A wind indicating device as described in claim 1, in which:

said wind direction indicator means includes a octagonal member mounted on said frame with indicia in each octant representing a particular azimuth point, said indicia being sufficiently large to be visible to the naked eye of an observer one hundred feet distant from said device, and arranged to represent to the observer wind direction relative to his facing.

9. A wind indicating device as described in claim 1, in which:

said frame of said vane means is generally C-shaped and is rotatably mounted with respect to said base to rotate about the axis of said shaft and is disposed with a marginal edge adjacent the path of the distal end of said pendulum arm;

said fin means of said vane means is operatively associated with said frame and disposed for engagement by wind in the vicinity of said base to rotate said frame upon changes in wind direction; and said scale indicia is disposed on said marginal edge of said frame.

10. An improved wind indicating device comprising:

a base;

a frame rotatably mounted on said base and disposed in a generally vertical position; said frame having a circle segment defining marginal edge and further including wind vane means disposed for engagement by wind in the vicinity of said base to rotate said frame in response to the direction of said wind, and wind direction indicating means disposed to indicate wind direction to a distant observer;

a shaft interconnected with said frame and disposed with its axis generally vertical;

rotor means mounted on said shaft and rotatable with respect to said frame, said rotor means being disposed for engagement and rotation by wind currents in the vicinity of said frame;

pendulum means operatively interconnected with said shaft and rotor means including an arm pivotally mounted at a proximal end and having its distal end disposed to swing outwardly with respect to said shaft axis upon rotation of said rotor means to enscribe a circle segment defining path on a vertical plane containing said marginal edge and said axis ; and which is concentric with and of slightly less radius than said circle segment defined by said marginal edge; and indicia constituting a readily readable scale disposed along said marginal edge whereby the position of said distal arm end of said enscribed path with reference to said scale indicates the wind velocity.

11. An improved wind indicating device as described in claim 10, in which:

said rotor means constitutes a fan having aerodynamically disposed fan blades and affixed to said shaft;

said shaft is rotatably mounted in said frame by means of needle bearings disposed to permit rotation of said shaft in said frame with extremely low friction; and said scale indicia includes markings on said marginal edge, spaced to correspond to predetermined positions of the distal end of said pendulum arm at particular wind velocities, said markings being color coded to represent velocity multiples and sufficiently large to be visible to the naked eye of an observer one hundred yards distant from said device.

12. An improved wind indicating device as described in claim 10, in which;

said frame has three members with semi-circular marginal edges mutually interconnected at their distal ends and disposed vertically about a generally vertical frame axis at angular spacing of substantially one hundred twenty degrees;

said shaft is mounted between said distal ends of said members and disposed with its axis aligned with said frame axis; and said scale indicia is disposed along said marginal edges of each of said members.

13. Ann improved wind indicating device comprising:

a base;

a shaft mounted in said base and disposed with its axis generally vertical;

wind vane means mounted on said shaft for engagement by wind in the vicinity of said base and disposed to rotate with respect to said base in response to changes in direction of said wind said wind vane means including a plurality of elongated non-linear members each disposed in separate intersecting vertical planes, said members being interconnected at said plane intersection and diverging therefrom, and a horizontal member interconnecting said divergent portions of said elongated members; and wind direction indicating means interconnected with said wind vane means and disposed to indicate to a distant observer facing said device the wind direction relative to his facing.

14. An improved wind indicating device as described in claim 13, in which:

said wind direction indicating means includes an octagonal member interconnected with said wind vane means and rotatable therewith, having indicia in each octant representing a particular azimuth point.

15. An improved wind indicating device as described in claim 13, in which:

said wind vane means has three elongated non-linear members mutually interconnected at their lower ends and disposed vertically about a generally vertical axis aligned with the axis of said shaft at relative angular spacing of substantially one hundred and twenty degrees.

16. An improved wind indicating device as described in claim 13, in which:

said wind vane means elongated non-linear members includes a pair of arcuate members disposed in a generally vertical position with their lower ends joined to form a mounting hub rotatably mounting said members on said shaft with distal portions extending beyond said hub to form a direction indicator and their upper ends diverging upwardly from said hub and interconnected at their distal portions by a generally horizontal wing member whereby said upper ends of said arcuate members and said wing member form a tail for said direction indicator which responds to wind in the vicinity of said base by moving said members in response to changes in the direction of said wind.

* * * * *